(12) United States Patent
Williams et al.

(10) Patent No.: US 10,630,805 B2
(45) Date of Patent: *Apr. 21, 2020

(54) SINGLE ACTION UPLOAD OF IMAGES FROM A MOBILE DEVICE

(71) Applicant: eBay Inc., San Jose, CA (US)

(72) Inventors: Hugh Evan Williams, Los Gatos, CA (US); Bhanu Koppaka, San Jose, CA (US); Jai Dandekar, Garden Ridge, TX (US); Govind Kaushal, San Francisco, CA (US); Matthew Bret MacLaurin, Santa Cruz, CA (US); Naren Chittar, San Jose, CA (US); John Sheeley, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,946

(22) Filed: Sep. 18, 2018

(65) Prior Publication Data

US 2019/0020728 A1 Jan. 17, 2019

Related U.S. Application Data

(63) Continuation of application No. 15/393,567, filed on Dec. 29, 2016, now Pat. No. 10,104,197, which is a (Continued)

(51) Int. Cl.
*G06F 15/16* (2006.01)
*H04L 29/08* (2006.01)
(Continued)

(52) U.S. Cl.
CPC ............ *H04L 67/306* (2013.01); *G06F 16/40* (2019.01); *G06Q 30/06* (2013.01); *G06Q 50/01* (2013.01);
(Continued)

(58) Field of Classification Search
CPC ............................... H04N 7/185; H04N 7/181
See application file for complete search history.

(56) References Cited

U.S. PATENT DOCUMENTS 8,508,338 B1 * 8/2013 Fiddy ............... G06Q 20/40145
340/5.52
9,538,149 B2 1/2017 Williams et al.
(Continued)

OTHER PUBLICATIONS

Corrected Notice of Allowbility received for U.S. Appl. No. 13/725,248 dated Sep. 16, 2016, 9 pages.
(Continued)

*Primary Examiner* — Arvin Eskandarnia
(74) *Attorney, Agent, or Firm* — Schwegman Lundberg & Woessner, P.A.

(57) ABSTRACT

Method and system is described to effectuate a single action upload of images from a mobile device. When the system detects activation of a visual control provided by an on-line service, the system activates a camera provided with the mobile device of the user, detects a resulting image captured by the camera, and uploads the resulting image from the mobile device of the user to a destination computing device. The destination computing device can be a server system associated with the on-line service.

20 Claims, 15 Drawing Sheets

Related U.S. Application Data continuation of application No. 13/725,248, filed on Dec. 21, 2012, now Pat. No. 9,538,149.

(60) Provisional application No. 61/653,654, filed on May 31, 2012.

(51) Int. Cl.

| | |
|---|---|
| *H04N 7/18* | (2006.01) |
| *G06F 16/40* | (2019.01) |
| *G06Q 30/06* | (2012.01) |
| *G06Q 50/00* | (2012.01) |
| *H04N 5/232* | (2006.01) |

(52) U.S. Cl.
CPC ............. *H04L 67/02* (2013.01); *H04N 7/181* (2013.01); *H04N 7/185* (2013.01); *H04N 5/232* (2013.01)

(56) References Cited

U.S. PATENT DOCUMENTS

| | | |
|---|---|---|
| 10,104,197 B2 | 10/2018 | Williams et al. |
| 2005/0177441 A1 | 8/2005 | Bryant |
| 2005/0197141 A1* | 9/2005 | Jiang ................. G06F 17/30876 455/457 |
| 2011/0016025 A1 | 1/2011 | Gaisford |
| 2011/0040648 A1 | 2/2011 | Steelberg et al. |
| 2011/0205435 A1* | 8/2011 | Lee .................... H04N 5/44543 348/563 |
| 2012/0096088 A1 | 4/2012 | Fahmy |
| 2012/0113216 A1* | 5/2012 | Seen ................. H04N 5/23293 348/38 |
| 2013/0053141 A1* | 2/2013 | Guerin ................... A63F 13/10 463/31 |
| 2013/0147970 A1* | 6/2013 | Herring ................. H04N 5/232 348/207.1 |
| 2013/0325955 A1 | 12/2013 | Williams et al. |
| 2017/0111472 A1 | 4/2017 | Williams et al. |

OTHER PUBLICATIONS

Final Office Action received for U.S. Appl. No. 13/725,248, dated Apr. 28, 2016, 13 pages.
Non-Final Office Action Received for U.S. Appl. No. 13/725,248 dated Jul. 29, 2015, 12 pages.
Notice of Allowance Received for U.S. Appl. No. 13/725,248 dated Aug. 25, 2016, 8 pages.
Response to Final Office Action filed on Jul. 27, 2016, for U.S. Appl. No. 13/725,248, dated Apr. 28, 2016, 9 pages.
Response to Non-Final Office Action filed on Dec. 29, 2015, for U.S. Patent Appl. No. 13/725,248, dated Jul. 29, 2015, 9 pages.
"U.S. Appl. No. 15/393,567, Preliminary Amendment filed May 8, 2017", 8 pgs.
"U.S. Appl. No. 15/393,567, Non Final Office Action dated Nov. 28, 2017", 7 pgs.
"U.S. Appl. No. 15/393,567, Response filed Mar. 5, 2018 to Non Final Office Action dated Nov. 28, 2017", 7 pgs.
"U.S. Appl. No. 15/393,567, Notice of Allowance dated Jun. 11, 2018", 8 pgs.
U.S. Appl. No. 13/725,248 U.S. Pat. No. 9,538,149, filed Dec. 21, 2012, On-Line Community Network of Sets.
U.S. Appl. No. 15/393,567 U.S. Pat. No. 10,104,197, filed Dec. 29, 2016, Single Click Upload of Mobile Images from a Mobile Device.
U.S. Appl. No. 15/393,567, filed Dec. 29, 2016, Issued.
U.S. Appl. No. 13/725,248, filed Dec. 21, 2012, Issued.

* cited by examiner

SCENARIO 01: UPLOAD A COLLECTION > ATTACH UPLOADED ITEM TO A PRODUCT WITHIN EXISTING CATALOG

- Homepage: User sees an invitation to photograph and upload their "things" to the site and see what collection they belong to
- Upload Collection: User clicks to the upload collection screen. Since photographs of the items have already been taken and are archived online/on-computer, user drags the photo to the "create new item" area to get started.
- Upload Collection: Once the picture has been dragged over and item created, the user starts typing in the details. Starting off with the item's name, the auto-complete menu pops open and shows existing products on the site which might be related to the item the user is creating a title for.
- Upload Collection: User doesn't see the title of the item being entered in within the auto-complete and finishes entering in the information and creates the first item within that set.
- Your Sets: Once the user has entered in all of the items, they "create" the set and are taken to their sets page to see it within their collection of sets inventory.

*FIG. 5*

SCENARIO 02: UPLOAD A COLLECTION > SAVES PRODUCT AND OPTS INTO COLLECTING FOR A COLLECTION SPECIFIC SET

- Homepage: User sees an invitation to photograph and upload their "things" to the site and see what collection they belong to

- Upload Collection: User clicks to the upload collection screen. Since photographs of the items have already been taken and are archived online/on computer user drags the photo to the "create new item" area to get started

- Upload Collection: Once the picture has been dragged over and item created, the user starts typing in the details. Starting off with the item's name, the auto-complete menu pops open and shows existing products on the site which might be related to the item the user is creating a title for.

- Upload Collection: User sees the title of the item within the auto-complete menu and chooses that one to be the title for the item.

- Upload Collection/Existing Collection Overlay: Once the user binds the item to the existing product, the user is prompted with an overlay dialog asking if they want to start uploading items for the existing collection or stay in their current task uploading items which may or may not connect to existing collections.

- Collection Specific Set: User agrees to connect to the collection and is taken back to the upload collection screen where the item has been pre-populated with catalog data within their sets section.

*FIG. 6*

SCENARIO 03: UPLOAD A COLLECTION > SAVES PRODUCT AND STAYS ON UPLOAD SCREEN IMPORTING MORE ITEMS

- Homepage: User sees an invitation to photograph and upload their "things" to the site and see what collection they belong to.
- Upload Collection: User clicks to the upload collection screen. Since photographs of the items have already been taken and are archived online/on-computer, user drags the photo to the "create new item" area to get started.
- Upload Collection: Once the picture has been dragged over and item created, the user starts typing in the details. Starting off with the item's name, the auto-complete menu pops open and shows existing products on the site which might be related to the item the user is creating a title for.
- Upload Collection: User sees the title of the item within the auto-complete menu and chooses that one to be the title for the item.
- Upload Collection/Existing Collection Overlay: Once the user binds the item to the existing product, the user is prompted with an overlay dialog asking if they want to start uploading items for the existing collection or stay in their current task uploading items which may or may not connect to existing collections.
- Upload Collection: User decides to keep uploading the rest of their items to their account.

*FIG. 7*

SCENARIO 04: SEARCH FOR A PRODUCT > WANT A PRODUCT AND CREATE A SET BASED ON THAT PRODUCT

- Homepage: User sees an invitation to search for collections on the site that might be of interest to them.
- Homepage: User types in a query into the search field and initiates the search for it.
- Search Results Page: Multiple results appear for both collections and products. User sees the product that is of interest and clicks on the link for it.
- Product View: User is taken to the product view page to see more details about it. In that page the user can see product details, the collection within which it lives, sets which contain the product created by other users in the community, and _____.
- Product View: User sees the ability to "want" or "own" the item. The user clicks "want" and is notified a new set has been added containing this item.

FIG. 8

SCENARIO 05: SEARCH FOR A PRODUCT > OWN A PRODUCT AND CREATE A SET BASED ON THAT PRODUCT

- Homepage: User sees an invitation to search for collections on the site that might be of interest to them.
- Homepage: User types in a query into the search field and initiates the search for it.
- Search Results Page: Multiple results appear for both collections and products. User sees the product that is of interest and clicks on the link for it.
- Product View: User is taken to the product view page to see more details about it. In that page, the user can see product details, the collection within which it lives, sets which contain the product created by other users in the community, and _____.
- Product View: User sees the ability to "want" or "own" the item. The user user clicks "own" and is notified a new set has been added containing this item.

FIG. 9

SCENARIO 06: SEARCH FOR A PRODUCT > FIND A COLLECTION AND OPT INTO A SET FOR IT

- Homepage: User sees an invitation to search for collections on the site that might be of interest to them.
- Homepage: User types in a query into the search field and initiates the search for it.
- Search Results Page: Multiple results appear for both collections and products. User sees the collection that is of interest and clicks on the link for it.
- Collection View: User is taken to the collection view page to see more details about it. In that page, the user can see the collection details, the popular sets created by users, and the entire inventory of products within that collection.
- Collection View: User sees the option at the top of the screen to opt into a set based on the collection which the user can personalize. The user clicks the button and is notified that a new set has been added.

FIG. 10

SCENARIO 07: SEARCH FOR A PRODUCT > COLLECTION NOT FOUND IN SEARCH RESULTS

- Homepage: User sees an invitation to search for collections on the site that might be of interest to them.
- Homepage: User types in a query into the search field and initiates the search for it.
- Search Results Page: User doesn't see the collection in the search results. An option available which the user sees is the ability to create a new collection.
- Search Results Page/Create Collection Overlay: Once the user clicks on the button create a brand new collection, an overlay appears, framing the impact of creating a brand new collection. User clicks "OK".
- Add Products To Collection: After the user clicks OK, user is taken to the add products page where the user can add products to the collection which they are creating.

*FIG. 11*

SCENARIO 08: CREATE A COLLECTION > ALERTING WHEN DUPLICATE COLLECTIONS ARE BEING DEVELOPED

- Add Products To Collection: Once the user is in the add products to collection flow to create the collection for the site, the primary objective is to inject products into the collection in order to complete and publish it.
- Add Products To Collection: Starts typing in the product title and an auto-complete is triggered to see if the product title the user is typing matches existing products already linked to existing collections

FIG. 12

SINGLE ACTION UPLOAD OF IMAGES FROM A MOBILE DEVICE

CROSS-REFERENCE TO RELATED APPLICATIONS

This application is a continuation of U.S. application Ser. No. 15/393,567, filed Dec. 29, 2016, which is a continuation of and claims the benefit of priority of U.S. application Ser. No. 13/725,248, filed Dec. 21, 2012, now issued as U.S. Pat. No. 9,538,149, which claims the benefit of priority of U.S. Provisional Application No. 61/653,654, filed May 31, 2012, each of which is hereby incorporated by reference in its entirety.

TECHNICAL FIELD

This application relates to a method and system to create and manage authoritative sets and user sets of collectible items on the web in the context of an on-line community system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Internet has spawned a host of busy social networking platforms. A typical social networking website graphical user interface (GUI) has a personal profile page with personal information and interests of a user, and is used to browse the social network member's information and contacts. Another user can initiate a communication by leaving messages or comments on the user's profile page.

BRIEF DESCRIPTION OF DRAWINGS

Embodiments of the present invention are illustrated by way of example and not limitation in the figures of the accompanying drawings, in which like reference numbers indicate similar elements and in which:

FIG. 5-12 illustrate example use case scenarios with respect to the on-line community network of sets, in accordance with example embodiments;

DETAILED DESCRIPTION

Figure 1:
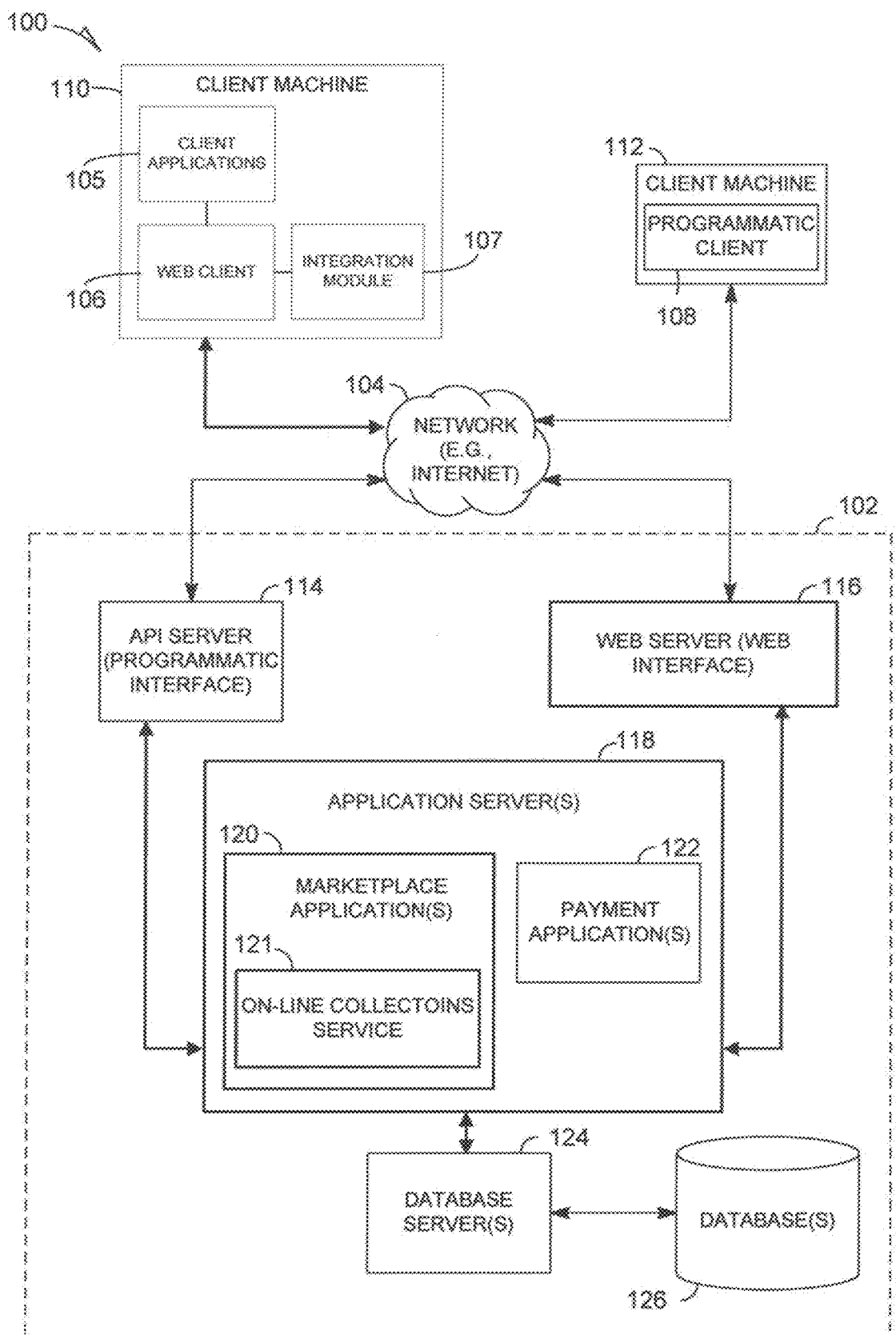
FIG. 1 is a network diagram depicting a client-server system 100, within which one example embodiment may be deployed.

Embodiments of the present invention include an on-line service that provide users with access to authoritative sets of various collectable items and permit users create and manage their own sets based on the respective authoritative sets. An authoritative set may be understood to be a collection of images representing collectable items and may also be termed a "collection" or "an authoritative set." For example, an authoritative set may comprise a set of images that represent a set of comic books, or a set of baseball cards, or a set of coins. A collection comprising a set of images, a so-called master set, may be created and validated by an authoritative entity. An authoritative entity may be, e.g., an entity maintaining a web site that provides information about collectable items, or, e.g., by an entity hosting an on-line social network platform. The master set composition may change, e.g., as the authoritative entity may add extra images representing additional collectible items (for example, an additional image representing a newly-created baseball card). Access to an authoritative set may be provided via a web site that facilitates a community space where users can compare their collected sets to the authoritative set and determine what products may be missing for their user's set.

A web site that provides users with access to authoritative sets (master sets) and allows them to create their own sets based on the master set may be termed an on-line collections network. The word "collections" is used interchangeably with the phrase "sets of collectible items." An on-line collection of collection may be in the form of images that represent collectible items. A user may be invited to join an on-line collections network by registering with the associated on-line service. A user may then create his own collection set based on a master set validated by the on-line collections network provider.

For example, a user may be a collector of baseball cards and may own a number of these cards. The user may join the on-line collections network, access a baseball cards master set provided and validated by the on-line collections network provider and create his own set based on the baseball cards master set. The user may then upload images of the baseball cards that he owns to the on-line collections network, such that the uploaded images become included into the user's set. The user may then arrange and sort the items in his set based on the state of the respective items and/or based on the desired action with respect to one or more items. For example, the user may arrange the baseball cards in his set (both the cards that he owns and the cards that he does not own but that are part of the set) into the following categories:

CARDS THAT I OWN
CARDS THAT I WANT TO OWN
CARDS THAT I'D TRADE
CARDS THAT I'D BUY
CARDS THAT I'D SELL

The categories shown above are just some examples of possible categories, as there may be additional and/or different categories, into which the items in a user's set may be organized. The user's set, as well as the categorization of the items in the user's set may be made available for viewing by other members of the on-line collections network.

A user may view his set in comparison to the respective master set and be able to easily ascertain which product(s) from the collectible set represented by the master set he is still missing in order to complete his set. The user may also be provided with a progress bar presented within the graphical user interface of the on-line collections network. The progress bar may be configured to indicate the extent, to which the user's set matches the master set.

A member of the on-line collections network may thus be able to browse one or more master sets, create his own set based on a selected master set, and view sets created by and made public by other members of the on-line collections network. Members of the on-line collections network may also be able to upload an image of a product and obtain information with respect to which collection that product is being part of. For example, a user may own a comic book but do not know which particular collection his card belongs to. The user may then upload an image of the card and receive the information with respect to which collection of baseball cards his card is part of.

Thus, when a user claims ownership of products represented in a master set, the user is requested to provide a verification of ownership to the on-line collections network service. This verification of ownership can be in the form of a picture of the product or it can be some other acceptable form, such as, e.g., a Serial Number, ISBN number etc., depending on the specific nature of the item. The on-line collections network service may be configured to include features in the associated user interface to guide the users about all acceptable forms of product ownership verification.

In one example embodiment, an on-line collections network provides an integration mechanism with a mobile device. When a user accesses the on-line collections network via n associated mobile application and indicates, via the associated GUI, that he owns a certain product and that an image of the product is to be added to the user's set, the user may be prompted to provide an image of the product using a camera provided with the mobile device. As the user activates a control indicating an agreement to provide an image of the product to the on-line collections network, the mobile application automatically activates the camera provided with re mobile device and uploads the resulting image up to the server hosting (or in communication with) the on-line collections network. This type of integration with a mobile device may thus provide a single click uploading of images via a mobile device. The resulting image may be uploaded (alternatively or additionally) to a client computer device of the user.

Example method and system to provide in-line refinement of on-line searches may be implemented in the context of a network environment 100 illustrated in FIG. 1 below, specifically as the on-line collections service 121.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, client applications 105 (e.g., mobile applications), an integration module 107, and a web client 106 (e.g., a mobile or desktop Web browser) operating on the client machine 110 (e.g., a mobile device), as well as a programmatic client 108 operating on the client machine 112.

An application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. Shown in FIG. 1 is an on-line collections service 121 included as one of the marketplace applications 120. The on-line collections service 121 may be utilized beneficially provide users access to authoritative sets of various collectable items and permit users create and manage their own sets based on the respective authoritative sets, as described herein.

The payment applications 122 may provide a number of payment services and functions to users. The payment applications 122 may, for example, allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1. to both form part of the networked system 102, it will be appreciated that, in alternative embodiments, the payment applications 122 may form part of a payment service that is separate and distinct from the networked system 102.

Further, while the system 100 shown in FIG. 1 employs client-server architecture, the subject matter of the application is of course not limited to such an architecture, and could equally well find application in a distributed, or peer-to-peer, architecture system, for example.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114

The integration module 107 on the client machine (e.g., a mobile phone) may submit requests to the marketplace applications 110, through the API server 114, for an up-to-date (e.g., current) publication related to master sets and user-created sets of collectable items via the networked system 102. Alternatively or additionally the client machine 110 may request information related to collections or users' sets from the client machine 112, via the network 104. In various example embodiments, the client machine 112 may provide information related to collections or users' sets to the client machine 110, e.g., after retrieving such information from the networked system 102.

The applications 120, including the on-line collections service 121, may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 126 via the database servers 128. An example system to provide an on-line collections service may be described with reference to FIG. 2.

Figure 2:
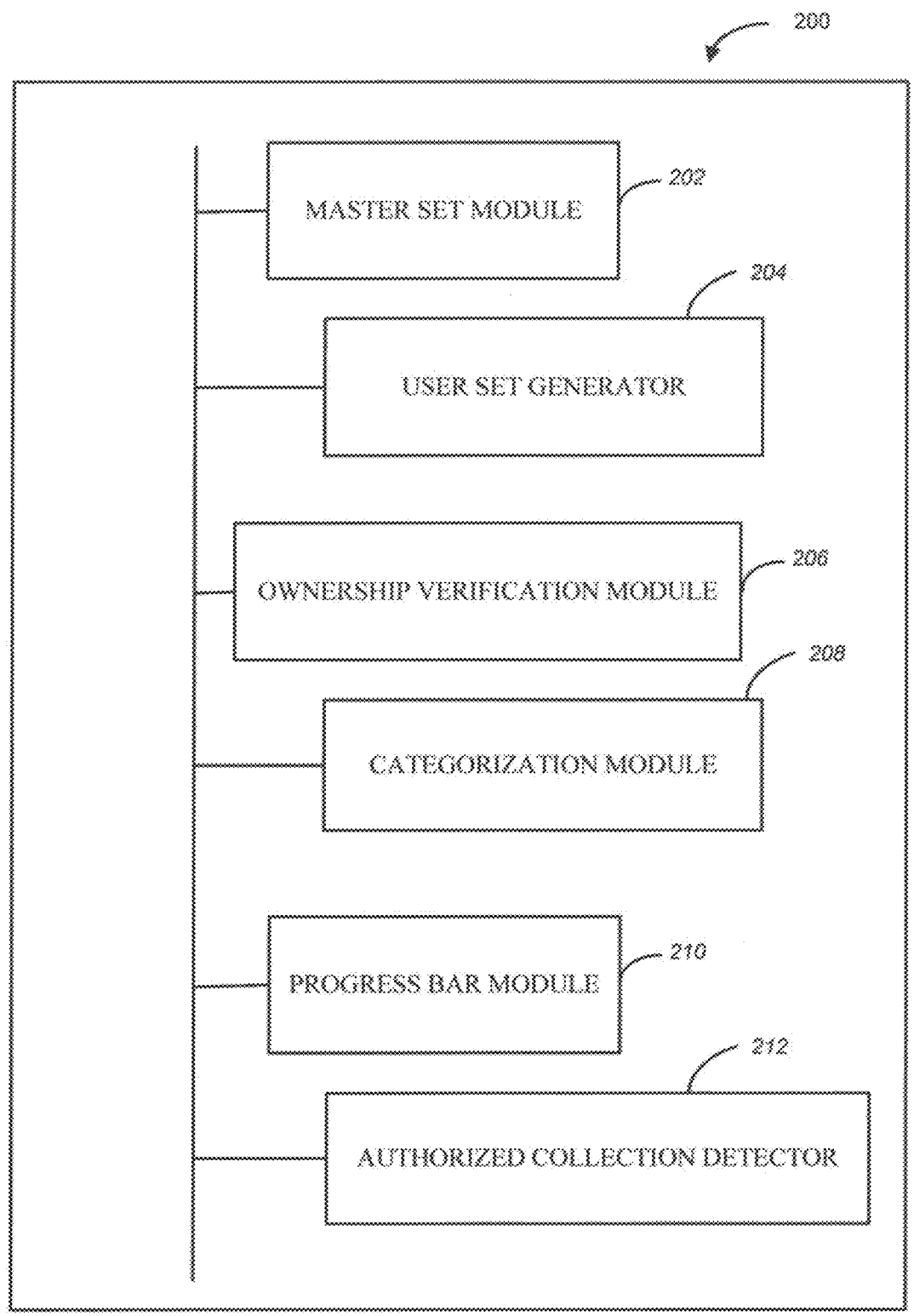
FIG. 2 is a block diagram of a system to provide an on-line collections service, in accordance with one example embodiment

FIG. 2 is a block diagram of a system 200 to provide an on-line collections service, in accordance with one example embodiment. As shown in FIG. 2, the system 200 includes a master set module 202 and a user set generator 204. The master set module 202 may be configured to create a master set of images (also referred to as an authoritative collection), where each image from the master set of images represents a collectable item. The user set generator 204 may be configured to create a user set based on the authoritative collection. The user set may comprise one or more images representing products from a collection that the user owns. The system 200 may further include an ownership verification module 206, a camera integration module 208, a categorization module 210, a progress bar module 212, and an authoritative collection detector 214.

The ownership verification module 206 may be configured to detect a request to add a member to the user set (e.g., to add to the user set an image of another user-owned product), and then request that the user provides a verification of ownership of that user-owned product. As mentioned above, the verification of ownership may be in the form of a picture of the product, a serial number associated with the product, etc. In one embodiment, the system 200 may engage the camera integration module 208 in response to the request to add a member to the user set. For example, the camera integration module 208 may be configured to activate a camera provided with a computing device of the user, detect a resulting image captured by the camera, upload the resulting image to a computer system, and include the resulting image into the user set. The camera integration module 208 may upload the resulting image to a server computer system hosting an online collections network, such as, e.g., the application server 118 of FIG. 1. The camera integration module 208 may also or alternatively upload the resulting image to a client computer system controlled by requesting user.

The categorization module 210 may be configured to arrange members in the user set based on respective states of the members in the user set and/or based on a respective desired action with respect to the members in the user set and display the members of the user set based on a result of the arranging. For example, as mentioned above, the user may arrange the actual and potential members in his set into the categories indicating the items from the associated authoritative set that the user currently owns, wants to own, would trade, would buy, would sell, etc. The progress bar module 212 may be configured to display a progress bar indicating completeness of the user set as compared to the master set.

Also shown in FIG. 2 is the authoritative collection detector 214. The authoritative collection detector 214 may be configured to detect a request associated with an image of a product from an unidentified collection and responsive to the request, upload the image of the product from an unidentified collection and obtain information with respect to which collection the product is part of. An example method to provide an on-line collections service can be described with reference to FIG. 3.

Figure 3:
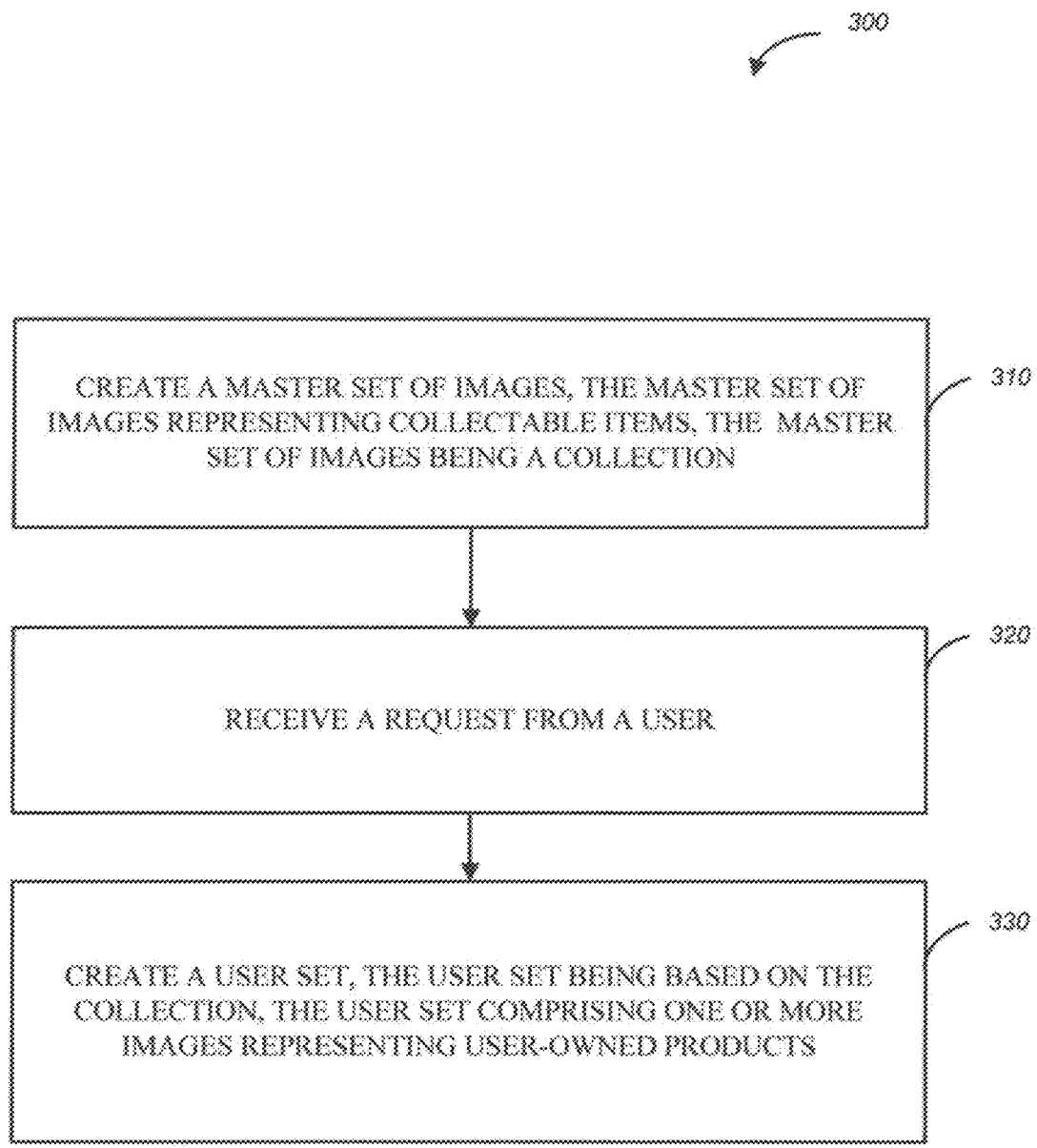
FIG. 3 is a flow chart of a method to provide an on-line collections service, in accordance with an example embodiment.

FIG. 3 is a flow chart of a method 300 to provide an on-line collections service, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 118 of FIG. 1 and, specifically, at the system 200 shown in FIG. 2. As shown in FIG. 3, the method 300 commences at operation 310, when the master set module 202 of FIG. 2 creates a master set of images (also referred to as an authoritative collection), where each image from the master set of images represents a collectable item. In response to a request from a user (operation 320), the user set generator 204 of FIG. 2 creates a user set based on the authoritative collection.

Figure 4:
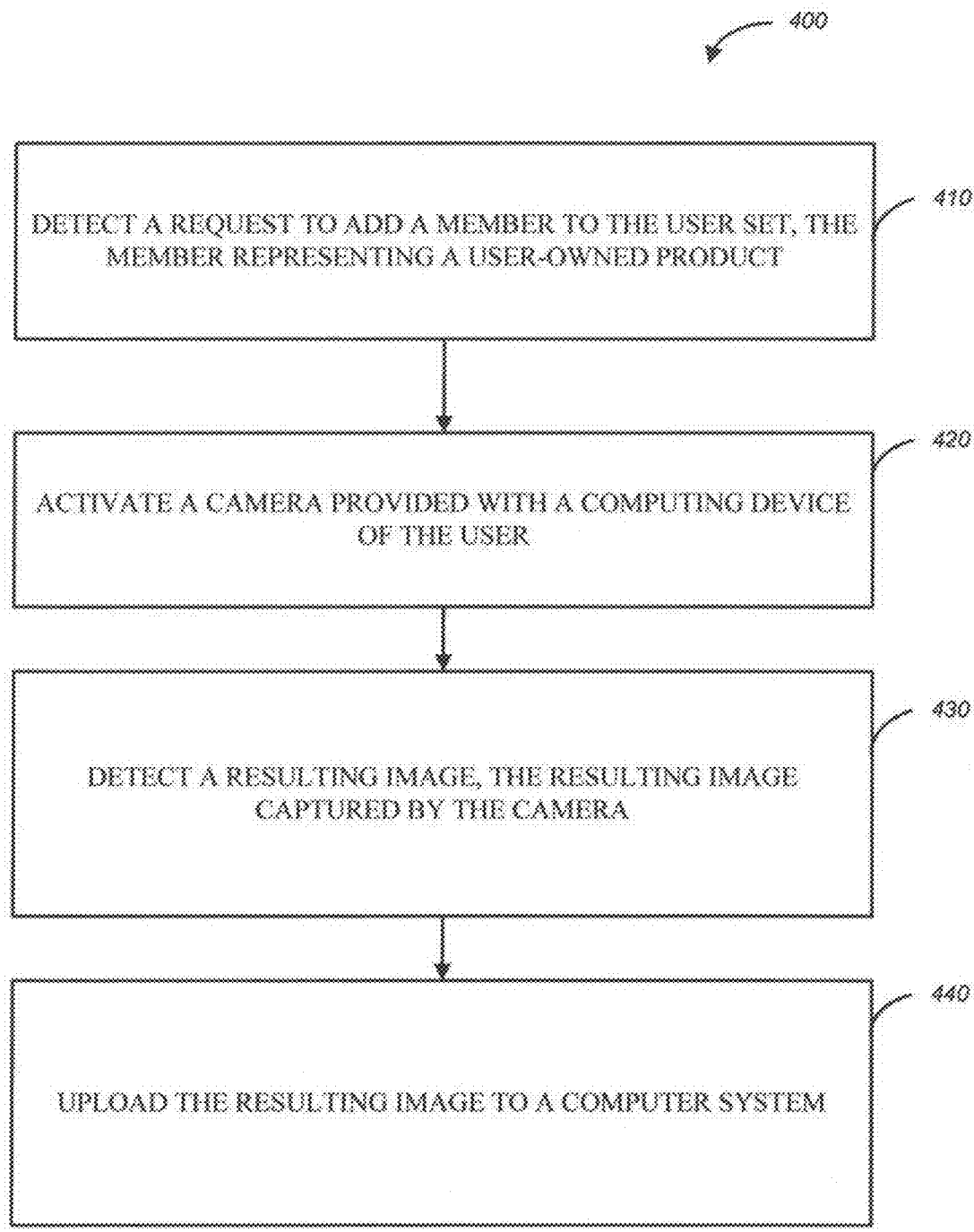
FIG. 4 is a flow chart of a method to utilize a camera device with an on-line collections service, in accordance with an example embodiment.

FIG. 4 is a flow chart of a method 400 to utilize a camera device with an on-line collections service, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 118 of FIG. 1 and, specifically, at the system 200 shown in FIG. 2. As shown in FIG. 4, the method 400 commences at operation 410, when the camera integration module 208 of FIG. 2 detects a request from a user to add a member to a user set of images representing collectible items. At operation 420, the camera integration module 208 activates a camera provided with a computing device of the user in response to the request. At operation 420, the camera integration module 208 detects a resulting image captured by the camera, and then uploads the resulting image to a computer system at operation 430.

Figure 13:
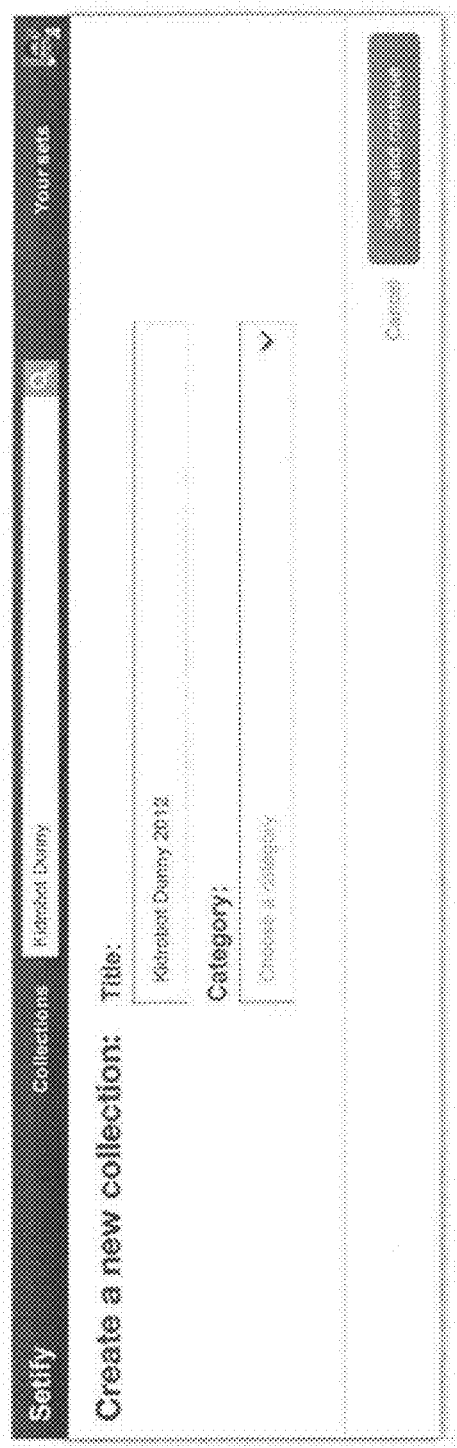
FIG. 13 shows an example user interface provided with an on-line community network of sets to create a new collection, in accordance with an example embodiment.
Figure 14:
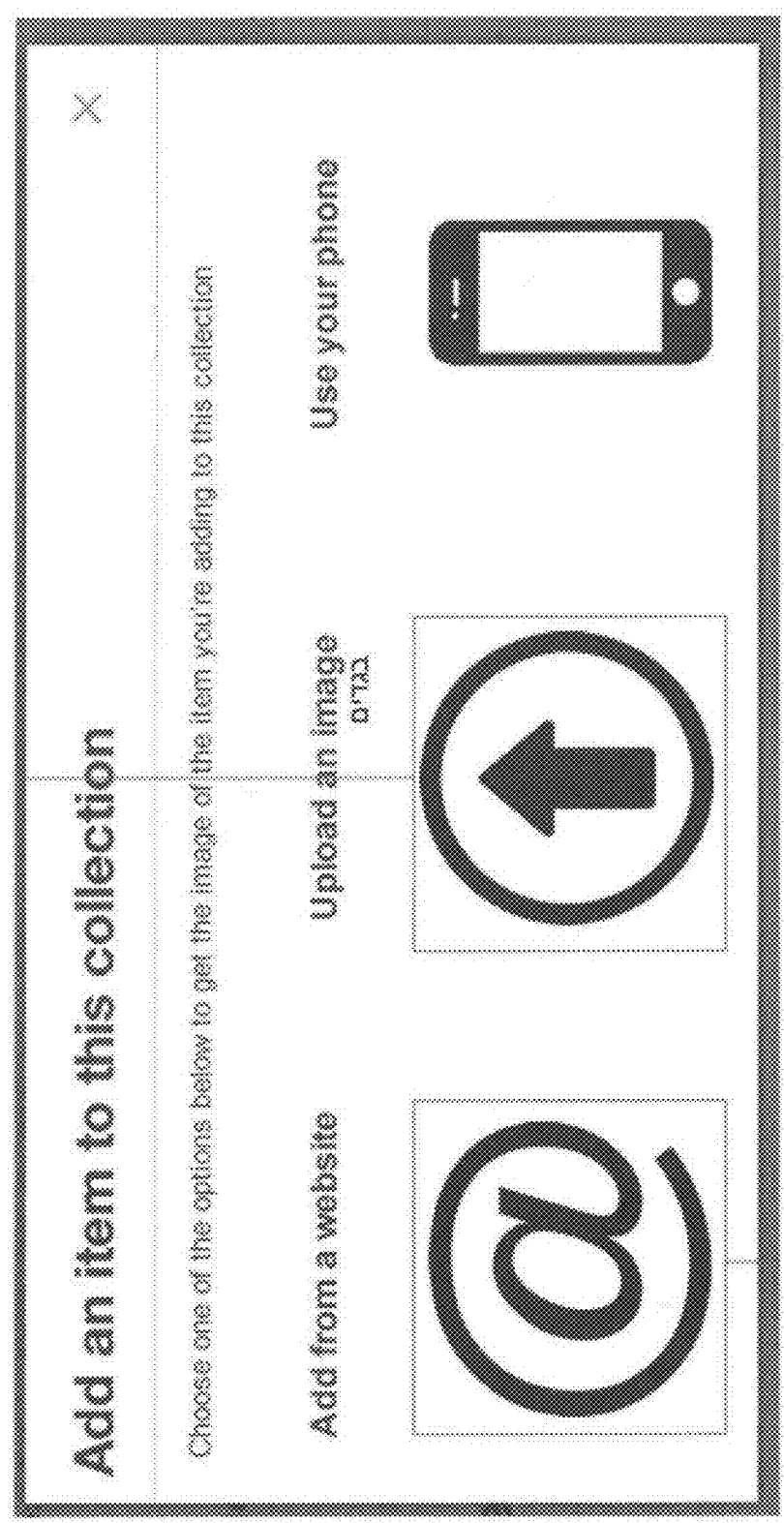
FIG. 14 shows an example user interface that may be provided with the on-line community network of sets to permit a user to add members to the user's collection, in accordance with an example embodiment.

FIG. 5-12 illustrate example use case scenarios with respect to the on-line community network of sets. FIG. 13 shows an example user interface that may be provided with the on-line community network of sets to create a new collection. A new collection may be a new authoritative set (a master set) or a new user's set based on a certain authoritative set. FIG. 14 shows an example user interface that may be provided with the on-line community network of sets to permit a user to add members to the user's collection. As is shown in FIG. 14, a member (also referred to as an item) may be added to a user's collection, e.g., by adding an image from a website, by uploading a previously-stored image or by using a camera (e.g., a camera provided with a mobile device) to capture an image and upload it to the on-line community network of sets.

Figure 15:
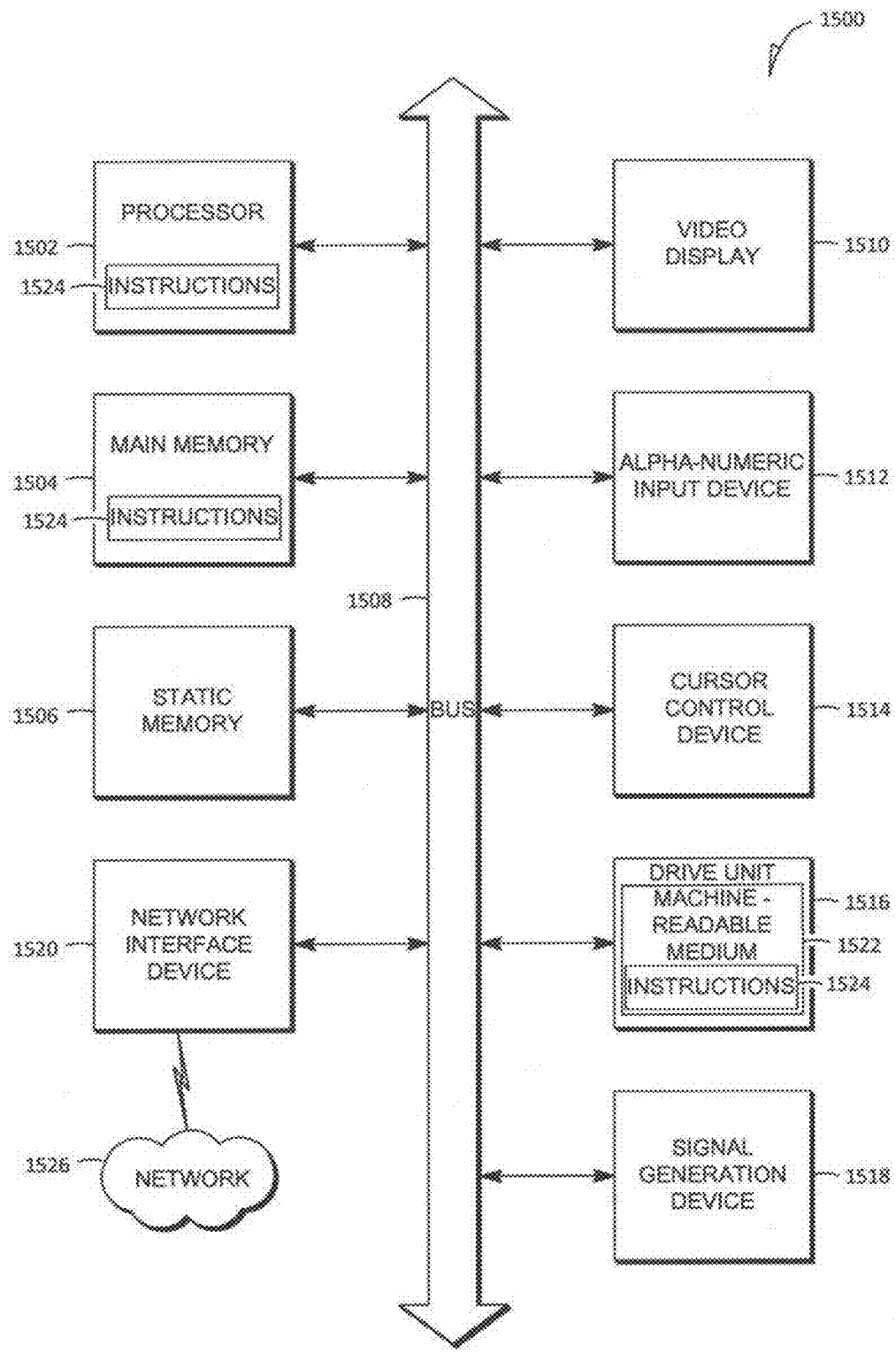
FIG. 15 is a diagrammatic representation of an example machine in the form of a computer system within which a set of instructions, for causing the machine to perform any one or more of the methodologies discussed herein, may be executed.

FIG. 15 is a diagrammatic representation of a machine in the example form of a computer system 1500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502. (e.g., a central processing unit (CPU), a graphics processing unit (GPU) or both), a main memory 1504 and a static memory 1506, which communicate with each other via a bus 15015. The computer system 1500 may further include a video display unit 1510 (e.g., a liquid crystal display (LCD) or a cathode ray tube (CRT)). The computer system 1500 also includes an alpha-numeric input device 1512 (e.g., a keyboard), a user interface (UI) navigation device 1514 (e.g., a cursor control device), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, with the main memory 1504 and the processor 1502 also constituting machine-readable media.

The software 1524 may further he transmitted or received over a network 1526 via the network interface device 1520 utilizing any one of a number of well-known transfer protocols (e.g., Hyper Text Transfer Protocol (HTTP)).

While the machine-readable medium 1522 is shown in an example embodiment to he a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to provide an on-line collections service have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
    detecting a single action at a mobile device, the single action being to activate a visual control provided by an on-line service that maintains collections of images representing collectable items; and
    using at least one processor, in response to the detecting of the single action and without intervening user actions:
    activating a camera provided with the mobile device of the user,
    detecting a resulting image captured by the camera, and
    uploading the resulting image from the mobile device to a destination computing device.

2. The method of claim 1, wherein the on-line service permits a user to create a user set of images based on a master set of images maintained by the on-line service.

3. The method of claim 2, wherein the master set of images is validated by the on-line service.

4. The method of claim 1, wherein the collectable items comprise comic books, baseball cards, or coins.

5. The method of claim 1, further comprising:
    creating a master set of images;
    detecting a request from the mobile device, the request initiated by a user via a graphical user interface (GUI), the request is to create a user set of images based on the master set of images, the user set of images comprising one or more images representing user-owned products; and
creating the user set of images.

6. The method of claim 5, further comprising:
    detecting a request to add an image representing a product o the user set of images; and
    in response to the request, prompting the user to provide an image of the product using the camera provided with the mobile device.

7. The method of claim 1, wherein the visual control provided by the on-line service is to obtain a user's agreement to provide an image to the on-line service.

8. The method of claim 1, wherein the destination computing device is a server computer system hosting the on-line service.

9. The method of claim 1, wherein the destination computing device is a client computer system distinct from a server computer system hosting the on-line service.

10. The method of claim 1, wherein the on-line service permits users to create respective user sets of images and view each other's sets of images.

11. A computer-implemented system comprising:
    one or more processors; and
    a non-transitory computer readable storage medium comprising instructions that when executed by the one or processors cause the one or more processors to perform operations comprising:
    detecting a single action at a mobile device, the single action being to activate a visual control provided by an on-line service that maintains collections of images representing collectable items; and
    in response to the detecting of the single action and without intervening user actions:
    activating a camera provided with the mobile device of the user,
    detecting a resulting image captured by the camera, and
    uploading the resulting image from the mobile device to a destination computing device.

12. The system of claim 11, wherein the on-line service permits a user to create a user set of images based on a master set of images maintained by the on-line service.

13. The system of claim 12, wherein the master set of images is validated by on-line service.

14. The system of claim 11, wherein the collectable items comprise comic books, baseball cards, or coins.

15. The system of claim 11, wherein the operations further comprise:
    creating a master set of images;
    detecting a request from the mobile device, the request initiated by a user via a graphical user interface (GUI), the request is to create a user set of images based on the master set of images, the user set of images comprising one or more images representing user-owned products; and
creating the user set of images.

16. The system of claim 15, wherein the operations further comprise:
    detecting a request to add an image representing a product to the user set of images; and
    in response to the request, prompting the user to provide an image of the product using the camera provided with the mobile device.

17. The system of claim 11, wherein the visual control provided by the on-line service is to obtain a user's agreement to provide an image to the on-line service.

18. The system of claim 11, wherein the destination computing device is a server computer system hosting the on-line service.

19. The system of claim 11, wherein the destination computing device is a client computer system distinct from a server computer system hosting the on-line service.

20. A machine-readable non-transitory storage medium having instruction data to cause a machine to perform operations comprising:
    detecting a single action at a mobile device, the single action being to activate a visual control provided by an on-line service that maintains collections of images representing collectable items; and in response to the detecting of the single action and without intervening user actions:

activating a camera provided with the mobile device of the user, detecting a resulting image captured by the camera, and uploading the resulting image from the mobile device to a destination computing device.

* * * * *